United States Patent [19]

Mugglestone et al.

[11] Patent Number: 4,527,840
[45] Date of Patent: Jul. 9, 1985

[54] LINEAR BEARING

[75] Inventors: Peter Mugglestone, Cranbury; John Cline, Highland Park, both of N.J.

[73] Assignee: Thomson Industries, Inc., Manhasset, N.Y.

[21] Appl. No.: 465,660

[22] Filed: Feb. 10, 1983

[51] Int. Cl.³ .............................................. F16C 29/06
[52] U.S. Cl. ..................................................... 308/6 C
[58] Field of Search .............. 308/3 R, 3 A, 6 R, 6 A, 308/6 B, 6 C

[56] References Cited

U.S. PATENT DOCUMENTS 3,353,875  11/1967  Karge ................... 308/6 R
3,876,264  4/1975   McCloskey ............ 308/6 C
4,030,191  6/1977   Ernst et al. ........... 308/6 C

FOREIGN PATENT DOCUMENTS 290984  6/1965  Netherlands ......................... 308/6 R Primary Examiner—Stuart S. Levy
Assistant Examiner—David Werner
Attorney, Agent, or Firm—Omri M. Behr

[57] ABSTRACT

A linear bearing can engage at least one longitudinal groove of a rod. The bearing has a primary carrier pivotally mounted on a frame. The carrier is sized to enter the groove. The bearing also has a pair of spaced rollers laterally projecting from the primary carrier. The rollers can ride upon the longitudinal groove.

8 Claims, 6 Drawing Figures

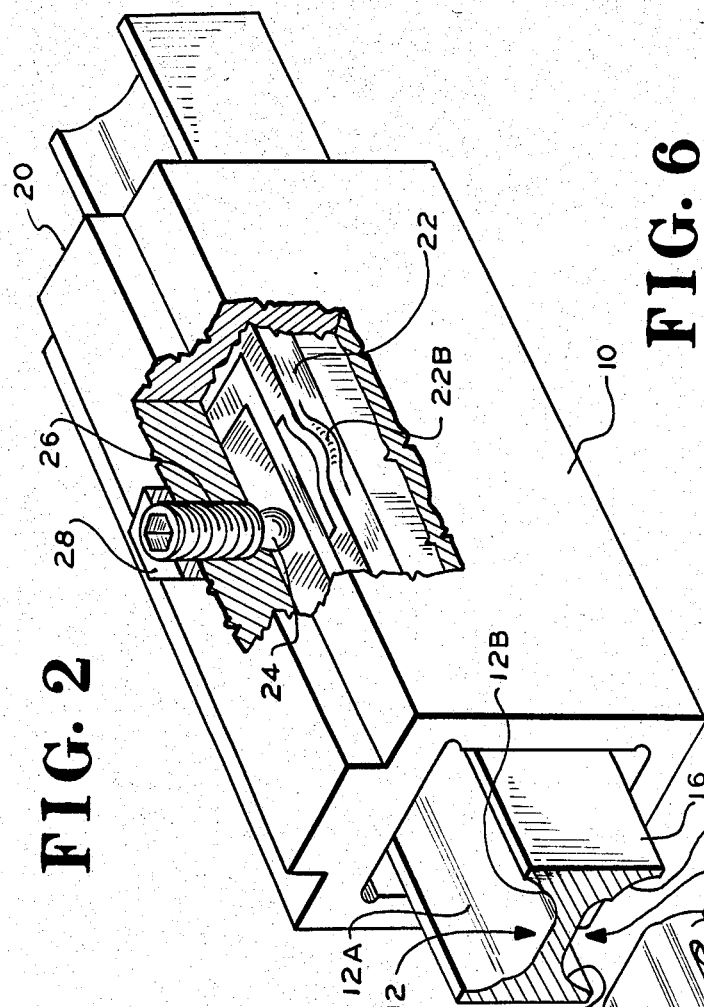
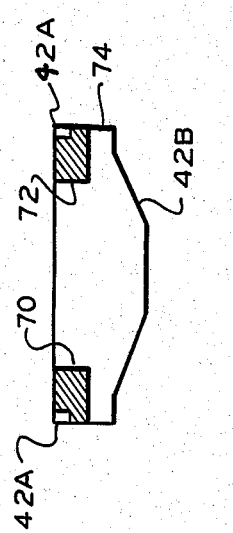
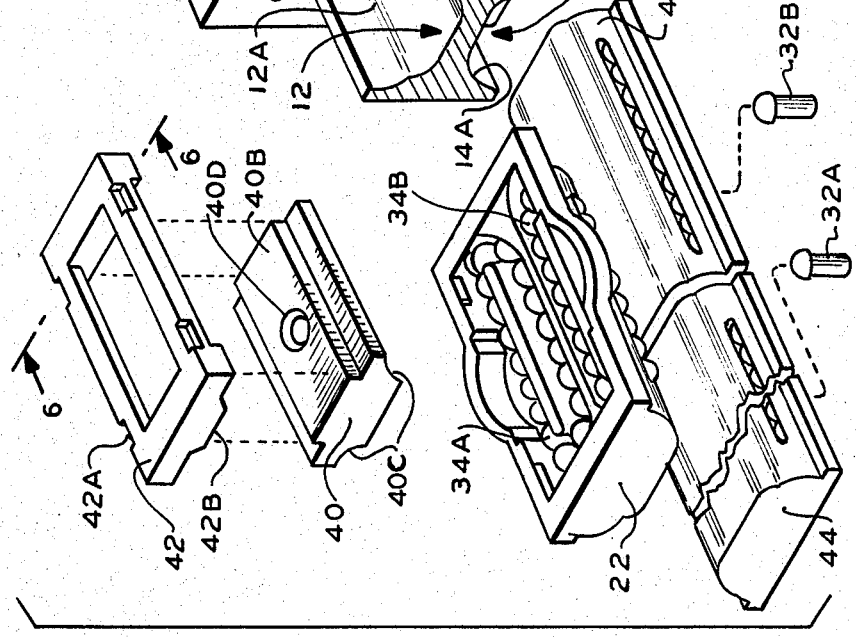

LINEAR BEARING

BACKGROUND OF THE INVENTION

The present invention relates to linear bearings for grooved rods and, in particular, to bearings that are easily aligned initially and adjusted for wear subsequently.

It is known to mount balls in closed loop raceways in a bearing carrier. These raceways have an outer track which opens onto an appropriate rod to provide a linear bearing surface. Linear motion of the rod causes the balls to circulate around the raceways. Known linear bearing assemblies have cooperated with a linearally moveable rod having an I-shaped cross-section (for example, U.S. Pat. No. 4,030,191). However, these assemblies do not provide any means for allowing the rod to seat and align itself properly. Furthermore, wear in these known bearing assemblies causes uncorrectable loosening thereby allowing rotational modes of movement that can cause binding. When such wear occurs, the assembly must be replaced.

Other examples of linear bearings can be found in U.S. Pat. Nos. 3,449,927; 4,144,830; and 4,296,974.

Accordingly, there is a need for an improved linear bearing which provides a degree of self-alignment and which can be readily adjusted to eliminate play resulting from wear.

SUMMARY OF THE INVENTION

In accordance with the illustrative embodiment demonstrating features and advantages of the present invention, there is provided a linear bearing for engaging at least one longitudinal groove of a rod. The bearing includes a frame and a primary carrier pivotally mounted on the frame. The carrier is sized to enter the groove. The linear bearing also has a pair of spaced rolling means laterally projecting between the primary carrier and the longitudinal groove.

By employing such apparatus, an improved linear bearing can align itself properly and can be adjusted for wear. In a preferred embodiment, the linear bearing engages a rod having opposing grooves so that its cross-section approximates the shape of an I-beam. This embodiment incorporates a carrier having within it two closed loop raceways to allow internal balls to circulate. The raceways have outside courses with windows through which passing balls may project to engage a groove of the grooved rod.

Preferably, three identical bearings are arranged in an isosceles triangle: two carriers in one groove and one in the other groove. A triangular arrangement provides structural stability so that the rod does not tend to rock in the plane of this triangle.

In this preferred embodiment, the bearing carriers are mounted on a frame by a ball and socket joint. This type of joint allows the bearing carrier to rotate or swivel with three degrees of freedom. This significant feature allows the bearing carrier to adjust itself to nonuniformities or perturbations in a grooved rod.

Additionally, the above ball and socket joint can be thrust inwardly by a threaded rod. Such adjustment allows one to remove play that develops from wear of the bearing or its grooved rod. Significantly, because the bearing tends to be self-aligning, a single adjustment of the pivot post of one bearing towards the other two, results in the alignment of all three bearings.

In the preferred embodiment, the grooves of the rod have side walls whose radii of curvature are centered at the point of rotation of the ball and socket joint of the bearing. This particular arrangement allows the bearing to be properly seated, notwithstanding small shifts in bearing position.

BRIEF DESCRIPTION OF THE DRAWINGS

The above brief description, as well as other objects, features and advantages of the present invention will be more fully appreciated by reference to the following detailed description of a presently preferred but, nonetheless, illustrative embodiment in accordance with the present invention, when taken in conjunction with the accompanying drawings wherein:

FIG. 2 is a perspective view, with portions broken away for clarity, of the linear bearing of FIG. 1;

FIG. 3 is an exploded view of bearing components within the frame of the apparatus of FIG. 2;

FIG. 6 is an end view along lines 6—6 of FIG. 3 of the retainer.

DETAILED DESCRIPTION OF THE PREFERRED EMBODIMENT

Figure 1:
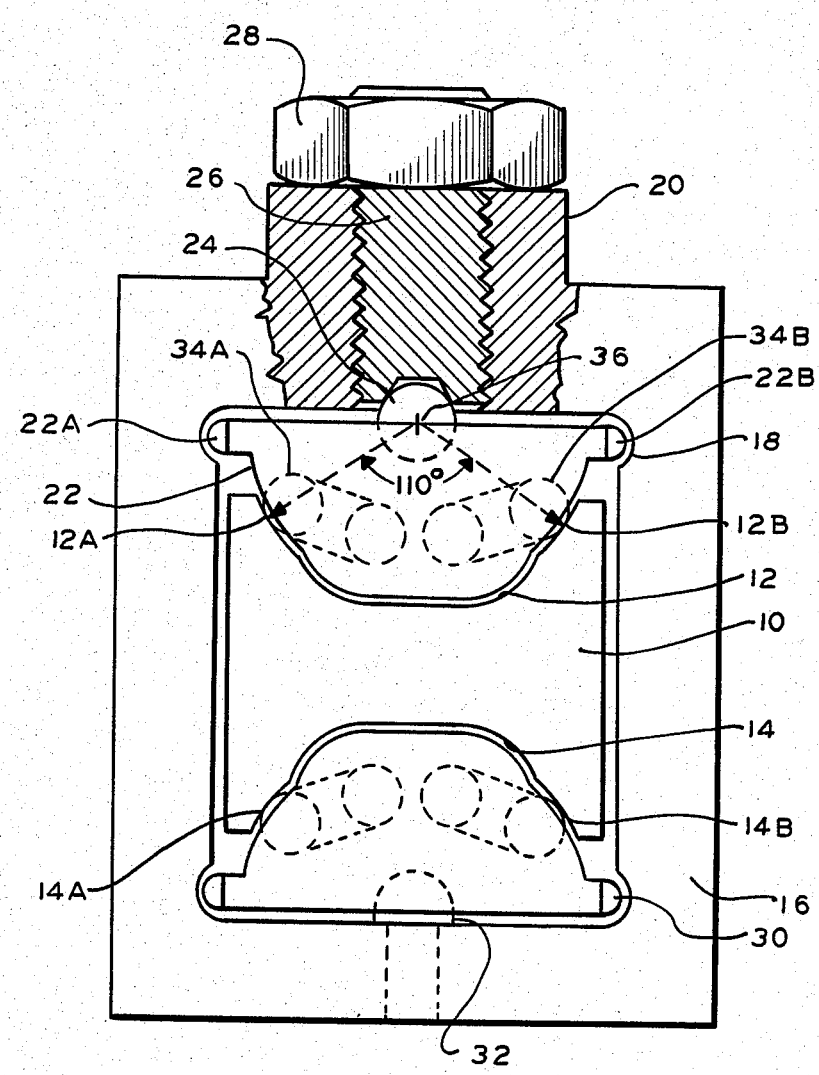
FIG. 1 is an end view, partly in section, of a linear bearing according to the principles of the present invention.

Referring to FIGS. 1 and 2, a rod 10 is shown having a pair of opposing grooves 12 and 14, thereby giving rod 10 an I-shaped cross-section. Rod 10 is mounted within frame 16 of a linear bearing. Frame 16 has a rectangular bore with relieved corners 18 and an upper boss or ridge 20 running the length of frame 16. Primary carrier 22 is shown herein fitted within groove 12. Ball 24 is seated in a countersunk hole in carrier 22, thereby forming a ball and socket joint. An opposing ball and socket joint is formed by an adjustment means in boss 20, shown herein as a threaded rod 26 having a lower frusto conical socket for engaging ball 24. Threaded rod 26 emerges on the outside of boss 20 and is locked in place by lock nut 28.

Groove 12 has a pair of opposing side walls 12A and 12B, having a radius of curvature centered at center 36 of ball 24.

Fitted into groove 14 of rod 10 are supplementary carriers 30. Supplementary carriers 30 are pivotally supported by studs 32, a pair of rivet-like devices, each having a hemispherical head and a cylinderical shank fitting into frame 16. Consequently, carriers 30 are able to swivel with three degrees of rotational freedom about the ball and socket joint formed by hemisphere 32 and the counter sunk bores in carriers 30.

Carrier 22 is shown herein with a pair of spaced rolling means comprising balls 34A and 34B (also referred to as rolling bodies). As described hereinafter in further detail, balls 34A and 34B can circulate on internal raceways and project against the side walls 12A and 12B through windows in the outside course of these raceways. The planes of the raceways are angled with respect to each other and are symmetrical about a plane including the center line of carrier 22 and the center of rotation 36 of ball 24. When balls 34A and 34B are positioned in the outside course to project onto side walls 12A and 12B, the angle between the balls with respect to apex 36 is 110 degrees.

Carrier 22 has a pair of opposing tabs 22A and 22B projecting laterally from the carrier. Tabs 22A and 22B restrict the range of rotation permissible by carrier 22 by engaging the inside of frame 16.

Referring to FIG. 3, an exploded view is given of the carriers of FIG. 1. Primary carrier 22 is shown herein including bearing plate 40 and retainer 42. Plate 40 has a ridge or boss 40B and a cylindrical pair of parallel undercuts 40C. Previously mentioned countersunk bore 40D is shown atop ridge 40B. Retainer 42 is shown as an assembly of four rails having atop each of its two longer rails two rectangular notches 42A. The shorter rails both have a trapezoidal boss 42B that engage matching shelves in carrier 22, as described hereinafter.

The supplementary carrier, as shown herein, has a first carrying portion 44 and a second carrying portion 46. The three carriers, 44, 46 and 22 (including their bearing plates and retainers) are identical and parallel, while carriers 44 and 46 are colinear. The relative positioning of carriers 44, 46 and 22 is suggested herein as a triangular arrangement wherein primary carrier 22 is longitudinally centered between carriers 44 and 46. As clearly shown herein, the hemispherical pivots (previously illustrated as pivot 32 of FIG. 1) are composed of pivot 32A and 32B, both of which are mounted in matching bores in the floor of frame 10.

Figure 4:
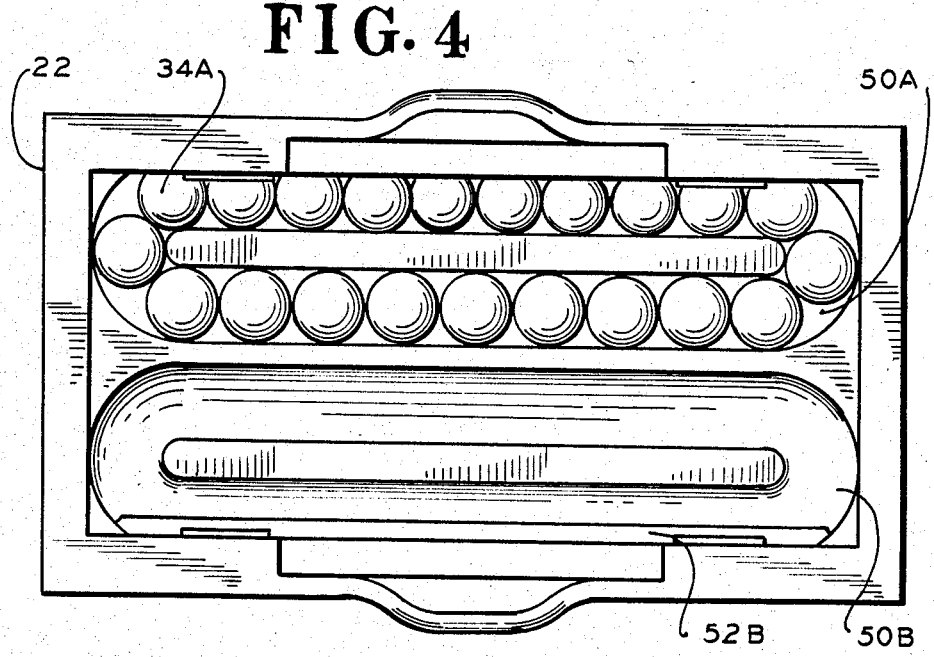
FIG. 4 is a plan view of one of the bearing carriers of FIG. 3 with its retainer and cover removed.

Referring to FIG. 4, a plan view is given of carrier 22, showing a pair of raceways 50A and 50B, including an inside and outside course. Each outside course has a longitudinal window, such as window 52B of raceway 50B Raceway 50A has an identical longitudinal window which is hidden from view by the balls 34A, balls having been deleted from raceway 50B for clarity. It will be appreciated that while balls are illustrated, in some embodiments cylinders may be employed instead.

Figure 5:
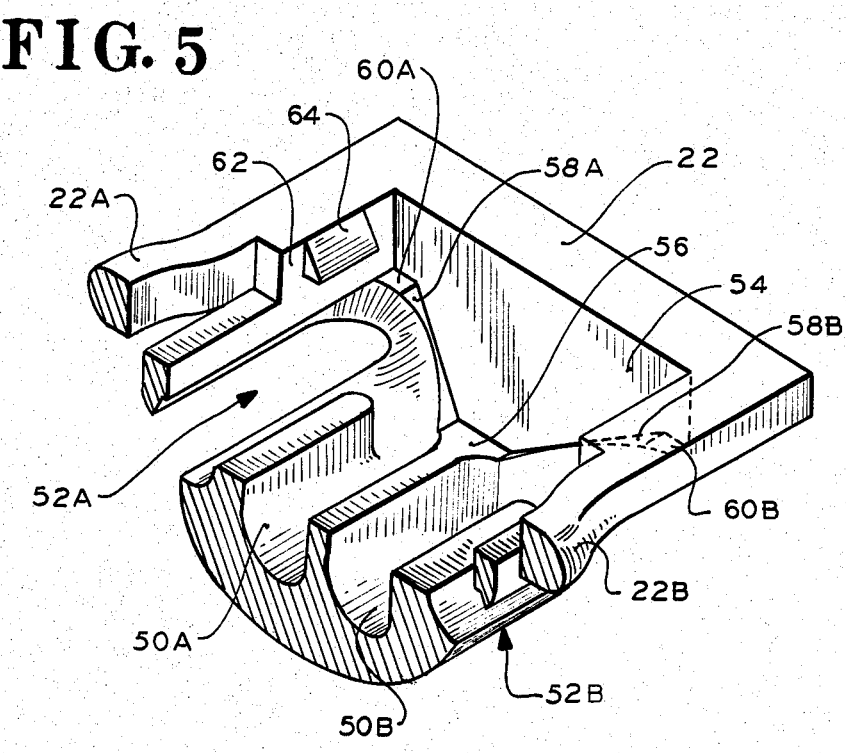
FIG. 5 is a perspective view, with a portion broken away for clarity, of the carrier of FIG. 4.

Referring to the perspective of FIG. 5, carrier 22 has been transversely sectioned at its mid-point and shows a wall 54, which is orthogonal to a floor 56. Truncated, inclined ramps 58A and 58B reach to plateaus 60A and 60B, respectively. Also orthogonal to wall 54 and floor 56 is another pair of opposing side walls, only side wall 62 being visible in this view. Raceways 50A and 50B are slots having semicircular bottoms routed into floor 56, inclined surfaces 58A and 58B, as well as plateaus 60A and 60B. The outside courses of raceways 50A and 50B open through windows 52A and 52B, respectively. The shape of windows 52A and 52B can be formed by routing an appropriate opening to produce the illustrated shape.

Side wall 62 supports a wedge-shaped retaining clip 64 which diverges inwardly. Wedge 64 is one of a pair of symmetrically disposed wedges on wall 62, only one being visible herein. The wall opposing wall 62 has identical wedges symetrically disposed on it.

Side wall 62 is notched and split to produce the previously mentioned tab 22A. Tab 22A is essentially shaped like a leaf spring to give some resiliency to its stopping and latching function. Tab 22B is shaped identically.

Referring to FIG. 6, it shows a pair of rails 70 and 72, having previously mentioned notches 42A. Notches 42A are positioned to receive the previously described wedges (wedges 64 of FIG. 5). Also rails 70 and 72 are affixed to end rail 74, having the previously mentioned trapezoidal boss 42B. Boss 42B is shaped to match the previously described floor 56, inclined surfaces 58A and 58B and shoulders 60A and 60B of FIG. 5.

Carrier assembly can be understood by considering the assembly of carrier 22. Carrier 22 is a molded (or machined) part, which is first fitted with 21 balls in each of the raceways 50A and 50B. Once installed in this fashion, bearing plate 40 (FIG. 3) is placed atop carrier 22. Undercuts 40C of bearing plate 40 match the outside track of raceways 50A and 50B, thereby providing an upper bearing surface to receive inward force applied to balls 34A and 34B. The balls are restrained when inside the inner course of raceways 50A and 50B by the center underside of plate 40. In the inner course of raceways 50A and 50B, there is clearance for the balls between the underside of bearing plate 40 and the bottom of the raceways. Similarly, in the outside course, the windows 52A and 52B provide clearance allowing the balls to roll within carrier 22.

Bearing plate 40 may be secured by pressing retainer 42 down around plate 40. The trapezoidal boss 42B will then seat against floor 56, inclined surfaces 58A and 58B and shoulders 60A and 60B (FIG. 5). When fully seated, wedges, such as wedge 64, will snap into the recesses 42A to securely hold retainer 42 in position.

To facilitate an understanding of the principles associated with the foregoing apparatus, its function will be briefly described. The apparatus of FIG. 2 can be assembled by first placing supplementary carriers 44 and 46 (FIG. 3) atop the hemispherical support pivots 32A and 32B, respectively, inside frame 16. Thereafter, rod 12 can be inserted atop carriers 44 and 46. Carrier 22 may be centered atop rod 12 with its countersunk bore 40D aligned with the bore of threaded rod 26.

Once aligned in this fashion, ball 24 is dropped into bore 40D and held there by threading down rod 26. Once appropriate pressure has been asserted by tightening rod 26, lock nut 28 may be placed over rod 26 to prevent inadvertent loosening.

Rod 12 may then be moved axially. Each of the carriers 44, 46 and 22 each react similarly and, therefore, only one, carrier 22, will be described here. As rod 12 moves relatively to carrier 22, balls 34A and 34B roll on tracks 12A and 12B (FIG. 1). In addition, these balls will roll on their respective raceways 50A and 50B and on undercuts 40C (FIG. 3). Such rolling causes balls 34A and 34B to circulate within carrier 22.

Because each of the carriers 22, 44 and 46 pivot by their ball and socket joint, they tend to seat and align themselves automatically. The surfaces presented by rod 12 cause bearing carriers 22, 44 and 46 to align themselves parallel to rod 12. Furthermore, as rod 12 reciprocates, the carriers 22, 44 and 46 can rock to account for irregularities or perturbations in rod 12.

Significantly, the system can be rapidly adjusted wherein any of the moving parts are worn. Assume track 12A has become worn more than track 12B because rod 12 received a torque applying additional forces on track 12A. Consequently, there will be some play in rod 12 that allows twisting or shifting of rod 12. An operator will therefore, loosen lock nut 28 and tighten rod 26 with an Allen wrench to remove the play. Importantly, the nonuniform wear will be accounted for by bearing carrier 22. If there is more clearance with respect to track 12A, carrier 22 can shift appropriately and seat itself properly in both tracks 12A and 12B. This seating and alignment is performed with one simple adjustment.

It is to be appreciated that various modifications may be implemented with respect to the above-described preferred embodiments. For example, the shape of the raceways and the number of balls contained therein may be altered in different embodiments. Furthermore, while the plane of the raceways are tilted with respect to each other, they may be coplanar in other embodiments. Furthermore, while an H or I-shaped rod is disclosed herein, it is apparent that other shapes can be used instead. Also, while a simple ball and socket is illustrated, other types of swiveling joints can be used in different embodiments. While it is preferable to match the center of curvature of the side walls of the rod to the center of rotation of the carrier, in other embodiments other curvatures may be employed, or plane surfaces may be employed instead. Also, the opening of the frame need not be rectangular, so long as it provides an appropriate structure for supporting the bearings. While three bearing carriers are disclosed, other numbers may be used. In a relatively simple embodiment, a single bearing carrier may underlie a single grooved rod, gravity simply holding them together. The components disclosed herein may be formed of various metals, plastics, ceramics or other materials having the desired weight, strength, temperature stability, ductility etc. Obviously, the illustrated dimensions of the components can be altered depending upon the size and scale of the application.

Obviously, many modifications and variations of the present invention are possible in light of the above teachings. It is, therefore, to be understood that within the scope of the appended claims, the invention may be practiced otherwise than as specifically described.

What is claimed is:

1. A linear bearing for engaging at least one longitudinal groove of rod, comprising:
   a frame;
   a primary carrier pivotally mounted on said frame and sized to enter said groove, said primary carrier being mounted to pivot with at least two degrees of freedom;
   said primary carrier having a pair of opposing, internal raceways each having an inside and outside course, said outside course of each of said raceways having a longitudinal window opening to the outside of said carrier, said rolling means comprising:
   a plurality of rolling bodies contained in said internal raceways for circulating therein, said rolling bodies being sized to project outwardly through the window of each of said raceways,
   the center of rotation of said primary carrier about said frame being equidistant from the center of the window of each of said raceways, said groove having a pair of sidewalls each having a radius of curvature centered at said center of rotation of said primary carrier about said frame.

2. A linear bearing according to claim 1 wherein planes of each of said raceways are symmetrical with respect to a plane containing the center line of said rod and said center of rotation of said carrier.

3. A linear bearing according to claim 2 wherein said frame and carrier are joined by a ball and socket joint.

4. A linear bearing according to claim 1 wherein said rod has at least two opposing grooves and wherein said bearing further comprises:
   a supplementary carrier pivotally mounted in said frame and sized to enter at least one of said grooves, said primary and supplementary carrier being mounted in opposition and being spaced to fit each into a different one of said grooves.

5. A linear bearing according to claim 4 wherein said supplementary carrier comprises:
   first and second carrying portions each mounted pivotally in said frame and each being positioned and sized to enter the same groove of said rod at separate positions that are longitudinally displaced in opposite directions from said primary carrier.

6. A linear bearing according to claim 4 further comprising:
   adjustment means for transversely moving the center of rotation of said primary carrier.

7. A linear bearing according to claim 6 wherein each of said carrying portions has a pair of opposing, internal raceways each having an inside and outside course, said outside course having a longitudinal window in its respective carrying portion.

8. A linear bearing according to claim 1 further comprising:
   adjustment means for transversely moving the center of rotation of said primary carrier.

* * * * *